H. GORTNER.
Hand Corn-Planters.

No. 138,392.  Patented April 29, 1873.

Witnesses.
C. B. Steele
Geo. E. Upham.

Inventor.
Henry Gortner,
Chipman Hosmer & Co,
Attys.

UNITED STATES PATENT OFFICE.

HENRY GORTNER, OF NASHPORT, OHIO.

IMPROVEMENT IN HAND CORN-PLANTERS.

Specification forming part of Letters Patent No. 138,392, dated April 29, 1873; application filed October 19, 1872.

*To all whom it may concern:*

Be it known that I, HENRY GORTNER, of Nashport, in the county of Muskingum and State of Ohio, have invented a new and valuable Improvement in Hand Corn-Planters; and I do hereby declare that the following is a full, clear, and exact description of the construction and operation of the same, reference being had to the annexed drawing making a part of this specification, and to the letters and figures of reference marked thereon.

Figure 1:
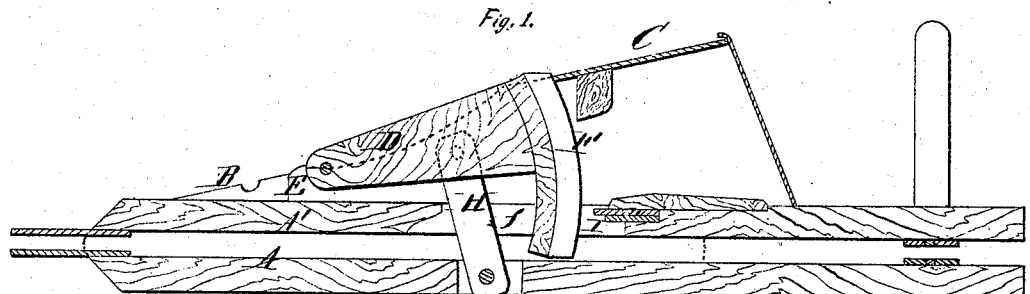
Figure 2:
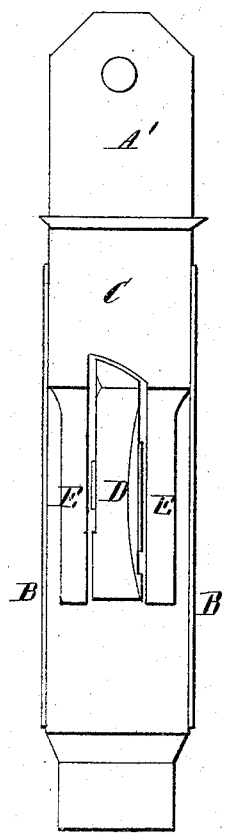
Figure 3:
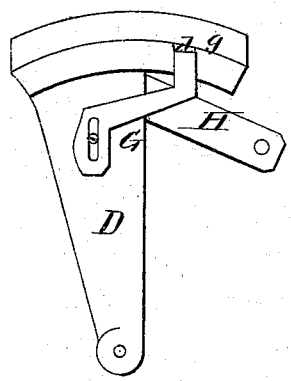

Figure 1 of the drawing is a representation of a sectional view of my invention. Fig. 2 is a front view of the same. Fig. 3 is a detail view of the same.

My invention has relation to hand corn-planters; and it consists in the construction and novel arrangement of the pivoted seed-slide and the adjustable plate for regulating the quantity of seed to be dropped in each hill, substantially as hereinafter described.

In the drawing, A A' designate two boards, constituting the front and back of the corn-dropper, and hinged together at their lower ends, the board A being provided with side plates B, through which pass hinge-pins projecting from the sides of the board A'. The plates B project over the sides of the boards A', and, at their upper ends, partially include the seed-hopper C. From the bottom of the latter, at the sides thereof, cleats E depend, and are secured to the board A'. Between and to these cleats is pivoted the leg D of the seed-slide, the latter consisting of a segmental or curved piece, F, having its upper surface beveled, and a notch cut at $g$ therein. This notch constitutes the seed-cup, the capacity of which is regulated by means of a Z-shaped slotted plate, G, attached to the side of the leg D, and furnished with a lug, $d$, which enters the notch, as shown. As this lug is raised or lowered the depth, and consequently the capacity, of the cup is regulated or varied. The slide F projects at one end beyond its leg, and passes through a slot, $f$, cut in the board A' near the bottom of the seed-hopper, and also through a slot or channel formed in the bottom of the box, as shown. The seed-slide and leg are held in proper position by means of an arm, H, pivoted at one end to the latter, and at the other end to the board A through a slot $a$, in which said arm passes.

As the boards A A' are brought together and drawn apart the seed is alternately let fall into its cup from the hopper, and allowed to escape therefrom between the boards and out at the bottom of the dropper.

The beveled form of the slide prevents any corn from resting on its surface and being thus carried from the hopper.

I designates strips of India rubber secured to the board A', and designed to prevent any corn from escaping, excepting what is carried out in the slide-cup.

What I claim as my invention, and desire to secure by Letters Patent, is—

As an improvement on my patent dated November 5, 1872, the pivoted angular seed-slide described, having the leg D, the slotted adjustable Z-shaped gage G, and the segmental piece F, constructed and arranged substantially as specified.

In testimony that I claim the above I have hereunto subscribed my name in the presence of two witnesses.

HENRY GORTNER.

Witnesses:
DAVID SHERRARD,
JOHN W. WOLLARD.